(12) United States Patent
Meritt

(10) Patent No.: US 6,216,927 B1
(45) Date of Patent: *Apr. 17, 2001

(54) MOUNTING SYSTEM FOR RELEASABLY AND SECURELY MOUNTING AN ENTERTAINMENT ACCESSORY WITHIN AN AUTOMOBILE

(76) Inventor: Ronald Meritt, 679 Avenida De Diamante, Arroyo Grande, CA (US) 93420

( * ) Notice: Subject to any disclaimer, the term of this patent is extended or adjusted under 35 U.S.C. 154(b) by 0 days.

This patent is subject to a terminal disclaimer.

(21) Appl. No.: 09/338,728

(22) Filed: Jun. 23, 1999

Related U.S. Application Data

(63) Continuation-in-part of application No. 09/236,743, filed on Jan. 25, 1999, now Pat. No. 6,092,705.
(60) Provisional application No. 60/095,191, filed on Aug. 3, 1998.

(51) Int. Cl.⁷ .............................. B60R 11/02; B60R 7/04
(52) U.S. Cl. ........................ 224/275; 224/929; 224/572; 224/563; 296/37.15; 296/37.16; 297/188.06; 297/188.07; 297/188.2; 273/148 B; 463/46; 463/47; 348/837
(58) Field of Search .................................. 224/275, 572, 224/539, 563, 929, 930; 348/837; 190/110; 273/148 B; 297/188.04, 188.05, 188.06, 188.07, 188.2, 188.21; 463/46, 47; 296/37.6, 37.15, 37.16

(56) References Cited

U.S. PATENT DOCUMENTS

| | | |
|---|---|---|
| 2,261,291 | 11/1941 | Salavsky . |
| 2,853,219 * | 9/1958 | Schwartz ............................... 224/275 |
| 3,014,759 * | 12/1961 | Bing ..................................... 224/563 |
| 3,690,446 | 9/1972 | Spainhour et al. . |
| 4,383,626 | 5/1983 | Weinblatt . |
| 4,506,769 | 3/1985 | Franco et al. . |
| 4,580,667 | 4/1986 | Herwood . |
| 4,585,196 | 4/1986 | Cormier . |
| 4,635,110 | 1/1987 | Weinblatt . |
| 4,658,956 | 4/1987 | Takeda et al. . |
| 4,673,070 | 6/1987 | Ambal . |
| 4,756,528 | 7/1988 | Umashankar . |
| 4,843,477 | 6/1989 | Mizutani et al. . |
| 4,982,996 | 1/1991 | Vottero-Fin et al. . |
| 5,177,616 | 1/1993 | Riday . |
| 5,226,576 | 7/1993 | Ellsworth . |
| 5,330,049 | 7/1994 | Bertelsen et al. . |
| 5,338,081 | 8/1994 | Young et al. . |
| 5,395,023 * | 3/1995 | Naymark et al. ................. 224/930 X |
| 5,555,466 | 9/1996 | Scribner et al. . |
| 5,725,189 | 3/1998 | Landy . |
| 5,865,502 * | 2/1999 | Ayers et al. ....................... 224/572 X |
| 5,868,294 | 2/1999 | Webster . |
| 6,092,705 * | 7/2000 | Meritt ................................... 224/275 |
| 6,097,448 * | 7/2000 | Perkins ............................. 224/275 X |

OTHER PUBLICATIONS

International Search Report dated Oct. 21, 1999 for International Application No. PCT/US99/17423.

* cited by examiner

Primary Examiner—Gregory M. Vidovich
(74) Attorney, Agent, or Firm—Akin, Gump, Strauss, Hauer & Feld, L.L.P.

(57) ABSTRACT

A mounting device for releasably and securely mounting an entertainment accessory within an automobile having a headrest extending from a seat. The mounting device includes an entertainment accessory and a case that can be releasably attached to the headrest. The entertainment accessory is positioned within the case and the case has a front side, a rear side, and a bottom side. A quick connect device is attached to the case for releasably engaging the headrest. A cover has one edge attached to the case. The cover is movable between a first position and second position. The cover overlaps the bottom side and the front side of the case while in the first position, and the cover serves as a spacer between the seat and the rear side of the case, while in the second position, to orient the case in a generally vertical position.

11 Claims, 11 Drawing Sheets

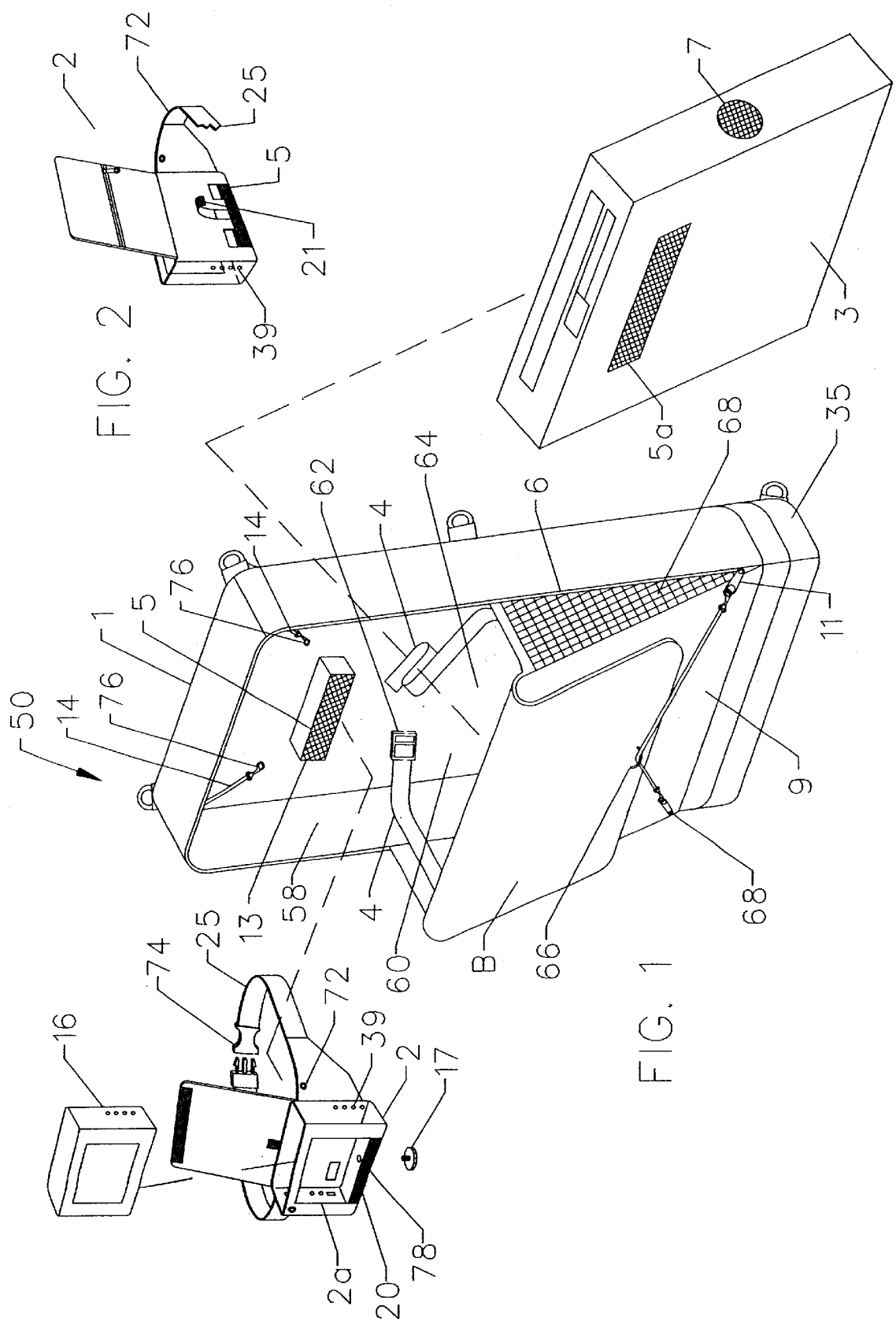

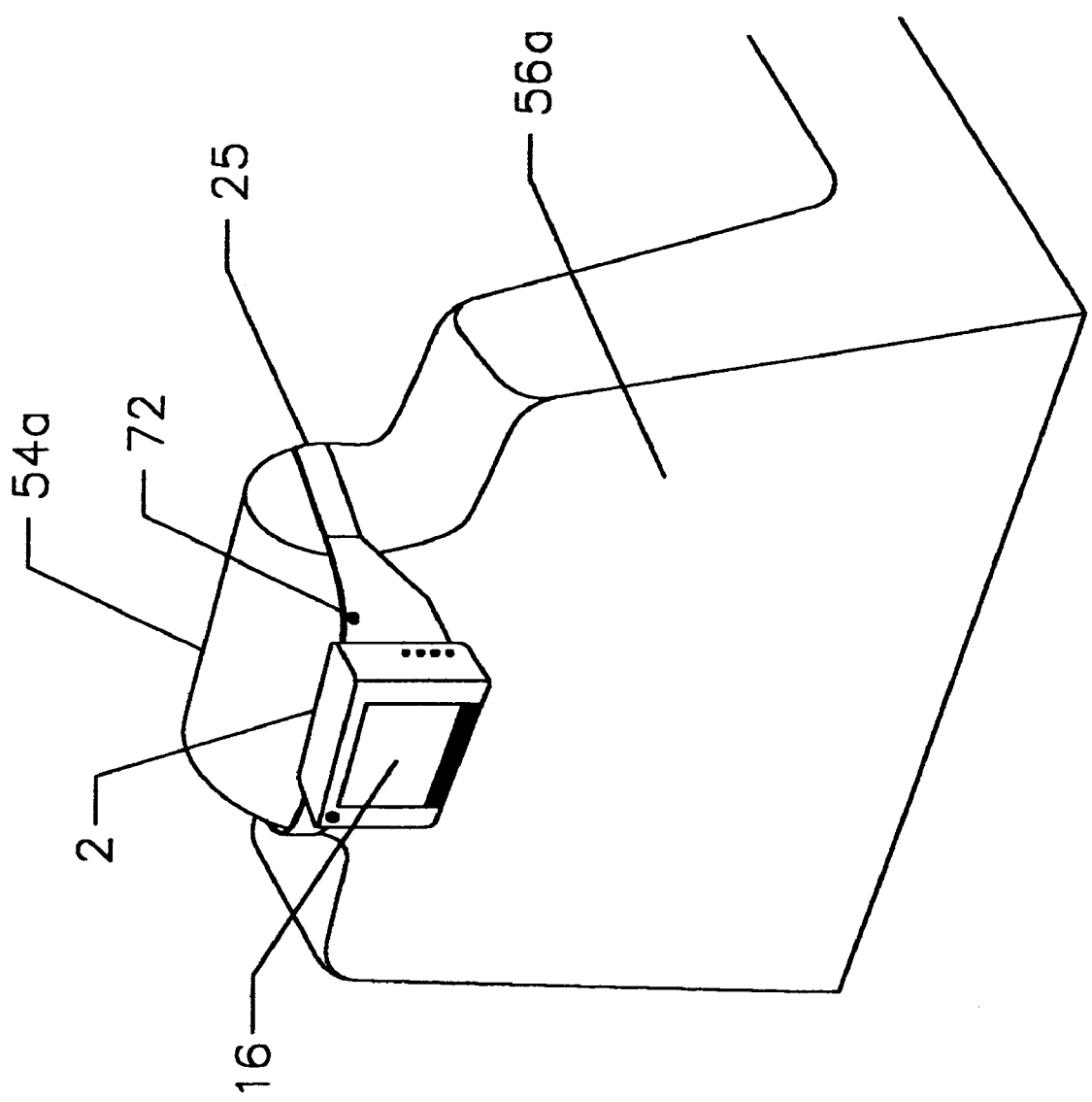

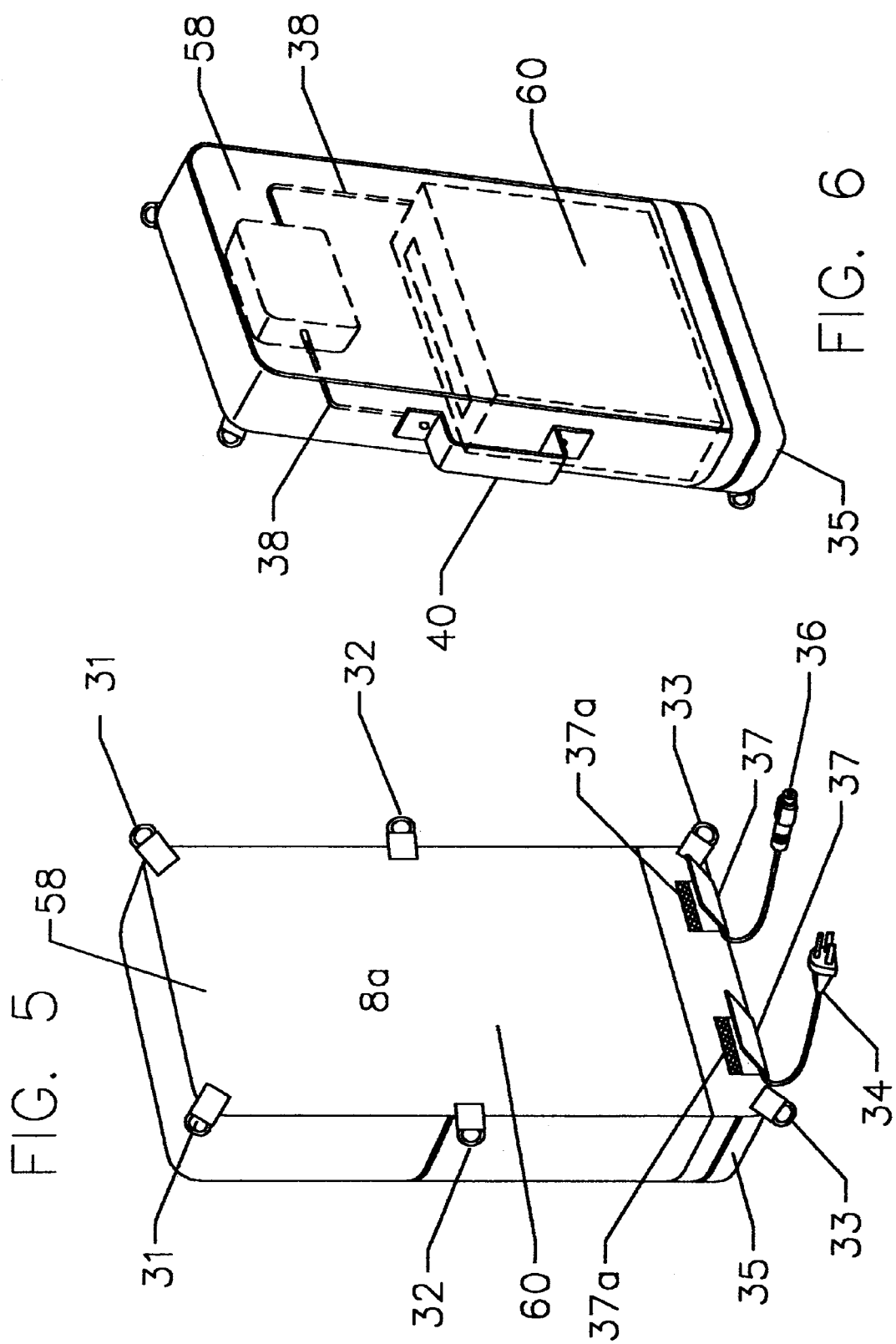

MOUNTING SYSTEM FOR RELEASABLY AND SECURELY MOUNTING AN ENTERTAINMENT ACCESSORY WITHIN AN AUTOMOBILE

This application is a continuation-in-part of U.S. patent application Ser. No. 09/236,743, filed Jan. 25, 1999, which has matured into U.S. Pat. No. 6,092,705 and which claims priority, under 35 U.S.C. § 119(e), to U.S. Provisional Application Ser. No. 60/095,191 filed on Aug. 3, 1998, entitled Universally Adjustable Harness for Video Monitor and Video Player for use in Passenger Vehicles, which is incorporated herein by reference in its entirety.

BACKGROUND OF THE INVENTION

This invention relates to consumer electronics for use in automobiles and, more specifically, to a mounting system for temporarily, safely and securely installing a display device and an electronic signal generating device in an automobile.

There are two basic types of electronic equipment that are used with automobiles, fixed electronics and portable electronics. Fixed electronics may include video players and monitors that are installed in floor mounted consoles, overhead consoles, and inside of seat backs. Portable electronics are generally televisions and video players that are designed to operate using the accessory 12 volt direct current outlet (typically a cigarette lighter) that is generally provided in automobiles. Unfortunately, these products are not generally able to be securely mounted to the interior of an automobile. This can create a life threatening hazard, as improperly securing portable electronics in an automobile can result in secondary collisions in the event of an accident.

Various devices have been developed for use with consumer electronics and automobiles. For example, Landy (U.S. Pat. No. 5,725,189) shows a floor mounted device which accommodates only a CRT or combination TV/VCR, with no provision for mounting a stand-alone VCR. There is no means of securing this device to the interior of the automobile. The present invention is a padded fabric case which houses a stand-alone video player and another padded fabric case housing a LCD TV. The large case is mounted to the backside center of the two front seats and secures to the automobile by means of four adjustable straps.

Young, et al. (U.S. Pat. No. 5,338,081) show a multi-purpose storage device which requires removal of the front seat and only mounts in limited types of automobiles. Young states that it is possible to "conveniently store" electronic devices such as tape or audio disk players, however, there are no specific accommodations for mounting these electronic devices. The present invention does not require the removal of a automobile seat and can accommodate both LCD and CRT TV's.

Cormier (U.S. Pat. No. 4,585,196) shows a rigid mounting device which only accommodates a CRT TV or combination TV/VCR. Cormier shows two possible methods of attachment. The first method shows the device mounted over a seat, with two rigid panels covering both the front and back of the seat. This makes the front seat unusable. The second method shows the device mounted over the center armrest of the front seat. Because the arm rest is designed to fold forward and the heavy CRT TV is mounted high this a potential safety issue. The present invention is a padded fabric case as opposed to Corer's rigid frame. The present invention securely mounts to the automobile and has a much lower center of gravity providing a higher level of safety.

Weinblatt (U.S. Pat. No. 4,383,626) shows a rigid mounting device. The device is mounted over a seat, with two rigid panels covering both the front and back of the seat. This makes the front seat unusable. The Weinblatt device also has a platform with two squared edges that are at head level to the driver and front passenger, raising safety concerns. The present invention uses a padded fabric case as opposed to Weinblatt's rigid frame. The present invention securely mounts to backside of the front seat and has a much lower center of gravity providing a higher level of safety.

Scriber, et al. (U.S. Pat. No. 5,555,466) show a permanently installed built-in device that is neither portable or removable as is the present invention. The TV's are permanently installed into the center backside of the front seats. The TV of the present invention can be installed in the center of the two front seats or on the backside of any headrest in the automobile.

Riday (U.S. Pat. No. 5,177,616) shows a permanently mounted TV attached to the console via a rigid hinged mounting arm. There are no accommodations for a VCR or rear seat viewing as in the present invention. The present invention is portable and accommodates viewing in the rear seat.

Vottero-Fin, et al. (U.S. Pat. No. 4,982,996) show a permanently installed rigid device which only accommodates a CRT TV. The Vottero-Fin device is mounted between the two front seats. The present invention is a portable soft case device which accommodates both CRT and LCD TV's. The present invention is mounted to the backside center of the two front seats and secures to the automobile by means of four adjustable straps.

The present invention provides a mounting system for portable electronics that is capable of easily, releasably, and safely securing a display device and an electronic signal generating device inside a automobile. Thus overcoming the limitations of devices of the contemporary art, discussed above, that either permanently mount inside the automobile or that are designed for combination televisions and video cassette recorders that are not designed for use in moving automobiles. The mounting system of the present invention is designed to facilitate the use of display devices with electronic signal generating devices to entertain passengers in a automobile.

The mounting system uses a self contained case to securely house the display device, the electronic signal generating device, and the associated accessories. The display device is mounted in a small case which can either be positioned inside a larger case or directly mounted to the back of a seat. The first case is releasably attached to the automobile and also functions as a storage and carrying case. The present invention provides a maximum level of safety for users. Each component is secured to prevent injury in the event of an accident.

While attempts have been made to secure video display devices in automobiles, there has been no effort to releasably and safely secure commercially available home-based video game players in automobiles, such as the video game players manufactured by NINTENDO, SEGA and SONY. Because TV reception in automobiles can be poor and because there is a limited repeatable entertainment value in videos, there is a need to be able to releasably and safely secure commercially available home based video game players and associated display devices in automobiles to permit individuals to play video games during automobile trips.

The present invention is directed to releasably and safely securing commercially available home-based video game players and associated display devices in automobiles to permit individuals to play video games during automobile trips. The present invention is a mounting device which safely and securely mounts the home-based video game player to the back of seat of an automobile in a position which permits the home-based video game player to operate.

SUMMARY OF THE INVENTION

Briefly stated, the present invention is directed to a mounting device for releasably and securely mounting an entertainment accessory within an automobile having a headrest extending from a seat. The mounting device comprises an entertainment accessory and a case that can be releasably attached to the headrest. The entertainment accessory is positioned within the case and the case has a front side, a rear side, and a bottom side. A quick connect device is attached to the case for releasably engaging the headrest. A cover has one edge attached to the case. The cover is movable between a first position and second position. The cover overlaps the bottom side and the front side of the case while in the first position, and the cover serves as a spacer between the seat and the rear side of the case, while in the second position, to orient the case in a generally vertical position.

The present invention is also directed to a device for releasably and securely mounting an entertainment accessory within an automobile having a headrest extending from a seat. The device comprises a case for being releasably attached to the headrest and for receiving the entertainment accessory. At least one strap is attached to the case for releasably engaging the headrest. A cover is attached to the case and comprises a first rigid panel and a second rigid panel. The first rigid panel is interposed between the case and the second rigid panel. The cover is positionable to serve as a spacer between the seat and the case to orient the case in a generally vertical position.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It is understood, however, that the invention is not limited to the precise arrangement and instrumentalities shown. In the drawings:

FIG. 1 is an exploded front perspective view of a mounting system for releasably and securely mounting an entertainment accessory within an automobile in accordance with a first preferred embodiment of the present invention;

FIG. 2 is a rear perspective view, partially broken away, of a portion of the mounting system shown in FIG. 1;

FIG. 3 is a rear perspective view illustrating a portion of the mounting system shown in FIG. 1 attached to a headrest;

FIG. 5 is a rear perspective view of the mounting system shown in FIG. 1 in the closed position;

FIG. 6 is a front perspective view of the mounting system shown in FIG. 1 in the closed position;

DETAILED DESCRIPTION OF THE INVENTION

Figure 4:
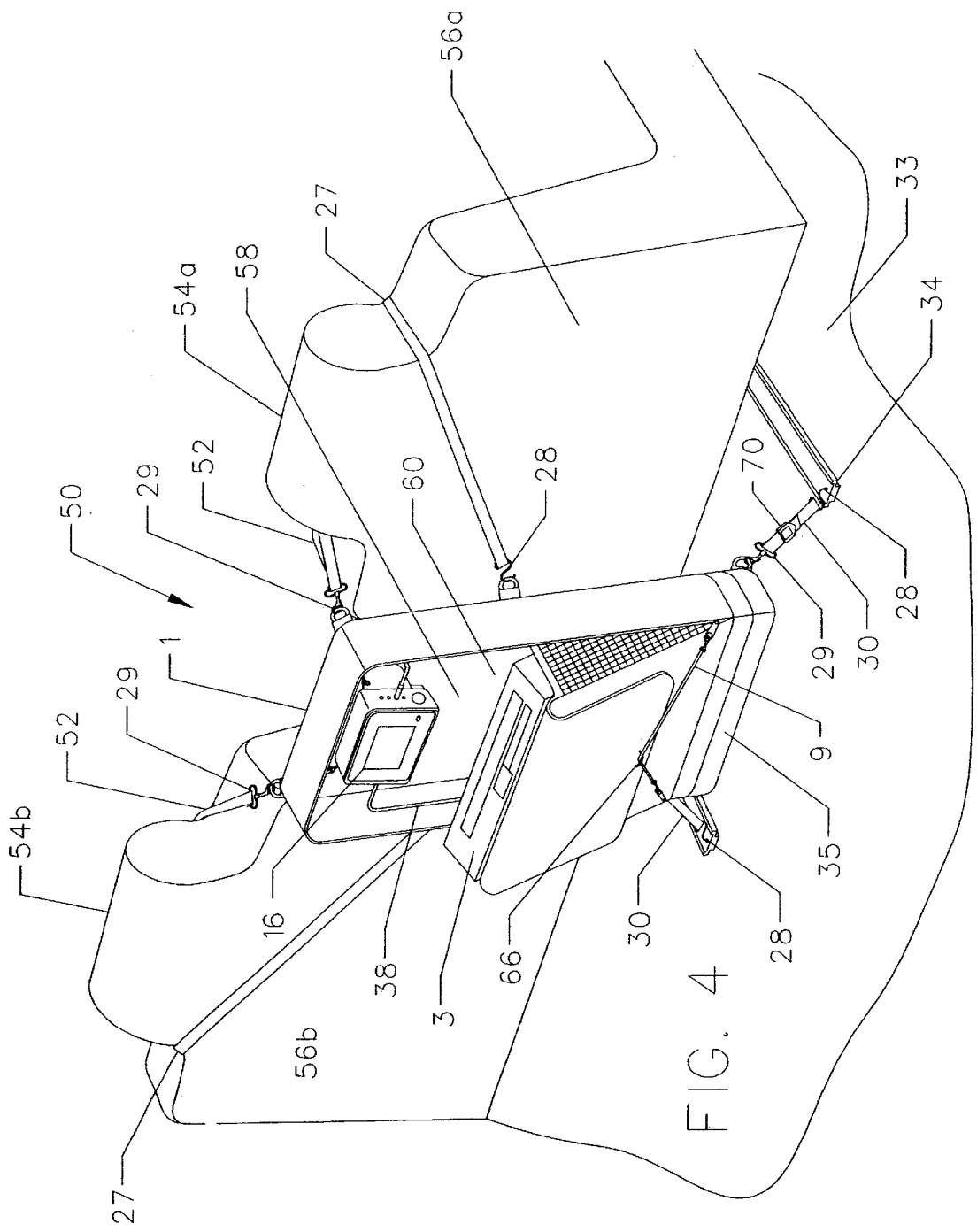
FIG. 4 is a rear perspective view of the mounting system of FIG. 1 secured within an automobile.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the mounting system and designated parts thereof. The terminology includes the words above specifically mentioned, derivatives thereof and words of similar import. Additionally, the word "a," as used in the claims, means "at least one."

Referring to FIGS. 1–8, wherein like numerals designate like elements throughout, there is shown a first preferred embodiment of a mounting system according to the present invention, generally designated 50. The mounting system 50 allows an entertainment accessory to be releasably secured in an automobile (partially shown) via a first quick connect device, generally designated 52, that is secured to at least one of first and second headrests 54a, 54b in an automobile. The term "automobile" as used in the specification and the claims should be understood to mean "any powered vehicle." Accordingly, those of skill in the art understand from this disclosure that the present invention is not limited to use with cars. For example, the mounting device 50 may also be used with seats in boats, airplanes, and trucks (as long as the vehicle has a seat that can be used to secure the mounting device 50).

This mounting system 50 is preferably constructed using two individual cases capable of housing the entertainment accessory which is in the form of a display device 16 and an electronic signal generating device 3. The smaller case, hereinafter referred to as the second case 2, houses the display device 16. The larger case, hereinafter referred to as the first case 1, houses the entertainment accessory 3. All electrical cables and power supplies, mounting straps, and accessories are contained in the first case 1. The first case 1 serves as a carrying case and a mounting platform for all the portable electronic components.

Referring to FIG. 4, the automobile has first and second headrests 54a, 54b extending from at least one seat and an internal floor 33 (partially shown) which supports seat rails 34 of the seat in a manner well understood by those of skill in the art. More particularly, the seat is preferably comprised of first and second bucket seats 56a, 56b with individual headrests 54a, 54b (as shown in FIG. 4). While the first and second headrests 54a, 54b are preferably integrally formed with the first and second seats 56a, 56b, respectively, it is understood by those of skill in the art from this disclosure that the mounting system 50 can be used with first and second headrests 54a, 54b that are extendable from the first and second seats 56a, 56b. While first and second seats 56a, 56b are shown in the drawings, it is understood that a single bench type seat with two headrests (not shown) could be used without departing from the spirit and scope of the invention.

Referring to FIGS. 1 and 4, the mounting system 50 includes a first case 1 for receiving the electronic signal generating device 3. The first case 1 further includes an upper portion 58 and a lower portion 60. The display device 16 is releasably attachable to the upper portion 58. The electronic signal generating device 3 transmits signals to the display device 16 via standard electrical cables and accessories 38. A pocket 64 is formed in the lower portion 60 of the first case 1 for receiving the electronic signal generating device 3.

The first case 1 houses the display device 16, electronic signal generating device 3, and electrical cables and accessories 38. The display device 16 is preferably an LCD television or monitor capable of receiving signals from the electronic signal generating device 3. However those of skill in the art will realize that the display device 16 is not limited to LCD televisions. For example, the display device 16 can be a cathode ray tube television, a plasma display television, or a monitor (not shown). In addition to receiving signals from the electronic signal generating device 3, the display device 16 may also receive radio frequency signals via an antenna (not shown). The display device 16 may also include a radio frequency transmitter to allow the user to receive the display device's 16 sound over the FM radio in the car. Alternatively to having a built in radio frequency transmitter, the display device 16 may use an external FM transmitter that is connected to the display device 16 via an earphone jack (not shown).

The electronic signal generating device 3 is preferably a video cassette player. The electronic signal generating device 3 is preferably secured inside the first case 1 by at least one strap 4. However, those of skill in the art will understand from this disclosure that the present invention is not limited to any particular method of securing the electronic signal generating device 3 inside the first case 1.

The electronic signal generating device 3 is positioned upright and attached to the inside of a zippered front panel 8 of the first case 1. The front panel 8 is in the form of a foldable flap and has a lower edge attached to the first case 1 and is pivotable about the lower edge relative to the first case 1. Unzipping the zippers (not shown) allows the front panel 8 of the first case 1 to extend forward approximately 15 degrees exposing the front control panel of the electronic signal generating device 3. Extending the front panel 8 to pivot the electronic signal generating device 3 exposes air vents 7 on the top and sides of the electronic signal generating device 3. The extension of the front panel 8 of the first case 1 is limited by two side panels 6. The two side panels 6 attach edges of the front panel 8 to the first case 1. At least one of the two side panels 6 is formed of a mesh material as shown in FIG. 1. The mesh material allows air flow between the side air vents 7 of the electronic signal generating device 3 and the outside of the first case 1. The two side panels 6 combine with the front panel 8 and back panel 8a to form the pocket 64 in the lower portion 60 of the first case 1. The pocket 64 is an expanding pocket which includes the strap 4 to secure the electronic signal generating device 3 therein.

The strap 4 is preferably a nylon strap, which is wrapped around the exposed side of the body of the electronic signal generating device 3. The strap 4 is secured to the electronic signal generating device 3 using an infinitely adjustable buckle 62. One side of the buckle 62 is sewn to the strap 4. As shown in FIG. 1, the strap 4 is disposed across the pocket 64. By using an adjustable strap 4, the lower portion 60 of the first case 1 can accommodate many different sizes and shapes of electronic signal generating devices 3. Hook material 5a is disposed on the bottom of the electronic signal generating device 3 to further secure the electronic signal generating device 3 to the inside surface of the front panel 8, which is made of loop material.

Referring now to FIG. 1, the front panel 8 is capable of covering both the upper portion 58 and the lower portion 60 of the first case 1. Additionally, the front panel 8 is foldable to expose the upper portion 58 of the first case 1. When operating the electronic signal generating device 3 the front panel 8 is folded back and secured with an elastic cord 9 which is fed through a catch 66. The front panel 8 has the catch 66 attached to a side that faces the upper portion 58 of the first case 1 while the front panel 8 is covering the upper portion 58 of the first case 1. The catch 66 is preferably a metal hook that is attached to the front panel 8, as shown in FIGS. 1 and 4. The elastic cord has a metal quick release fastener 68 at each end which is attached to the left and right front panel zipper handles 11.

Referring to FIG. 4, a first quick connect device 52 releasably secures the first case 1 to a location proximate to the internal floor 33 and to one of the first and second headrests 54a, 54b. The first quick connect device 52 includes a first releasable strap 27 extending between one of the first and second headrests 54a, 54b and the first case 1. The first quick connect device 52 also includes a second releasable strap 30 extending between the seat rail 34 on the internal floor 33 and the first case 1. More specifically, a pair of first releasable straps 27 and second releasable straps 30 extend between the first case 1 and first and second seats 56a, 56b and the rails 34 on the internal floor 33, respectively.

The first case 1 is preferably positioned on the rear side of and between the first and second seats 56a, 56b, as shown in FIG. 4. However, the first case 1 could be positioned on the rear side of only one of the first and second seats 56a, 56b (not shown). The first case 1 is installed using the first quick connect device 52. The first and second releasable straps 27, 30 is preferably constructed of nylon. The first and second releasable straps 27, 30 are preferably each comprised of a metal S shaped connector 28, a metal quick release fastener 29, and an adjustable buckle 70.

Referring to FIGS. 1 and 4–6, the first case 1 has an upper, middle, and lower metal ring (31, 32, 33, respectively) on either side, to which the first quick connect device 52 is attached. For example, the right side of the first case 1, as viewed in FIG. 4, is mounted to the first seat 56a by attaching the metal quick release fastener 29 of a first releasable strap 27 to the upper right metal ring 31 of the first case 1. The first releasable strap 27 is looped around the first headrest 54a and the S shaped connector 28 is attached to the middle metal ring 32 of the first case 1. The other first releasable strap 27 is secured to the second headrest 54b and second seat 56b in a similar fashion.

Each second releasable strap 30 extends between a location proximate to the internal floor and the first case 1. Each second releasable strap 30 secures the lower portion 60 of the first case 1 by attaching a metal quick release connector 29 to the lower right metal ring 33 and attaching a S shaped connector 28 to the seat rail 34. The second releasable strap 30 is then tightened using an infinitely adjustable buckle 70.

Figure 8:
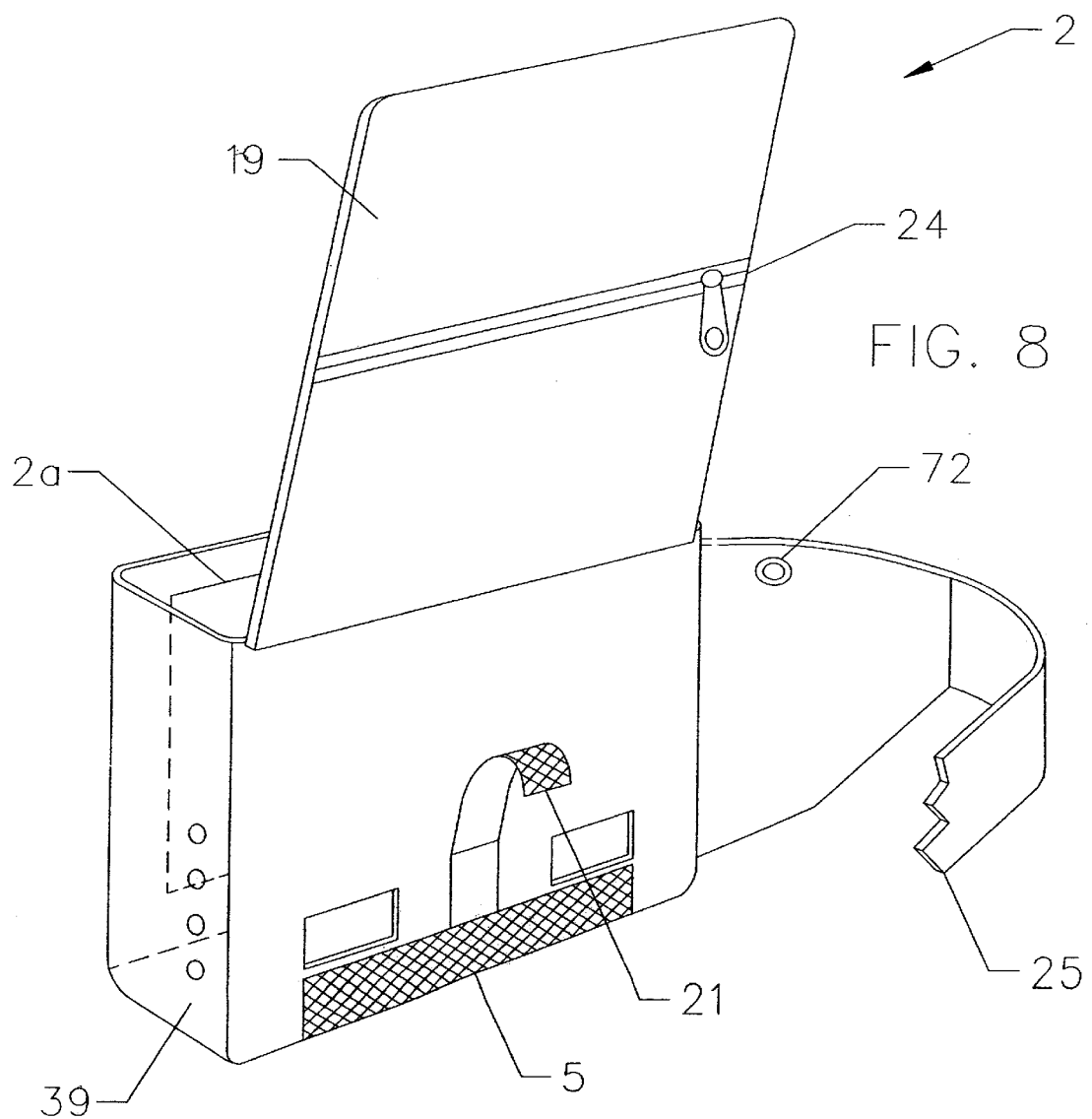
FIG. 8 is a greatly enlarged view of FIG. 2.

Referring now to FIGS. 1, 2, and 8, a second case 2 is attachable to the upper portion 58 of the first case 1 for receiving the display device 16. The second case 2 receives the display device 16 and the first case 1 includes a second quick connect device 14 for releasably securing the second case 2 to the first case 1. A portion of the second quick connect device 14 is hook and loop material 5 that secures the rear side of the second case 2 to an abutment 13 that forms a spacer between the first case 1 and the rear side of the second case 2.

The abutment 13 is mounted inside the upper portion 58 of the first case 1 and positioned to abut a rear side of the second case 2 while the second case 2 is attached to the upper portion 58 of the first case 1. The purpose of the abutment 13 is to modify the viewing angle of the display device 16 to compensate for any tendency of the display device 16 to orient with the screen facing at a downward angle. The abutment 13 is preferably comprised of a rectangular foam block (not shown) encased in a nylon zippered enclosure. The zipper (not shown) allows the installation of various sized foam blocks to adjust the viewing angle.

The second quick connect device 14 further includes two metal quick release fasteners 76 which are located inside the first case 1. The metal quick release fasteners 76 are each connected to one of the two metal grommets 72 in the strap of the second case 2. The grommets 72 are preferably metal rings that are placed inside of holes in the second case 2 to protect the edges of the second case 2 along the periphery of the holes from wear and abrasion.

The second case 16 has a locking device 17 for securing the display device 16 to the second case 2. The display device 16 has a threaded hole (not shown) in a bottom surface to allow the locking device 17 to be secured to the display device 16 after passing through a correspondingly sized grommet 78 in the bottom of the second case 2. The locking device 17 is preferably a threaded bolt with a knurled knob.

Referring now to FIGS. 1, 2 and 8, the second case 2 may be mounted inside the first case 1 or mounted on the rear of one of the first or second headrests 54a, 54b (see FIG. 3). The second case 2 is preferably constructed using a padded nylon enclosure generally in the form of a parallelpiped that envelops the body of the display device 16. The second case 2 has a generally rectangular opening 2a to permit viewing of the display device 16. The display device 16 is secured inside the second case 2 by the locking device 17. A roll up cover 19 is pivotally secured to the top of the second case 2. The terminal end of the cover 19 includes hook and loop material 20 which corresponds to the hook and loop material 20 on the front face of the second case 2 across the bottom thereof. The cover 19 is folded over the front of the second case 2 and secured with the hook and loop material 20 when the display device 16 is to be stored. In use, the cover 19 is rolled up and held in place near the top of the second case 2 along the rear surface thereof by the small patch of hook and loop material 21a on the front of the cover 19 and the strap 21 of hook and loop material extending from the rear of the second case 2. The top of the cover 19 includes a zippered compartment 24 for receiving a remote control (not shown) for the display device 16 therein.

Figure 7:
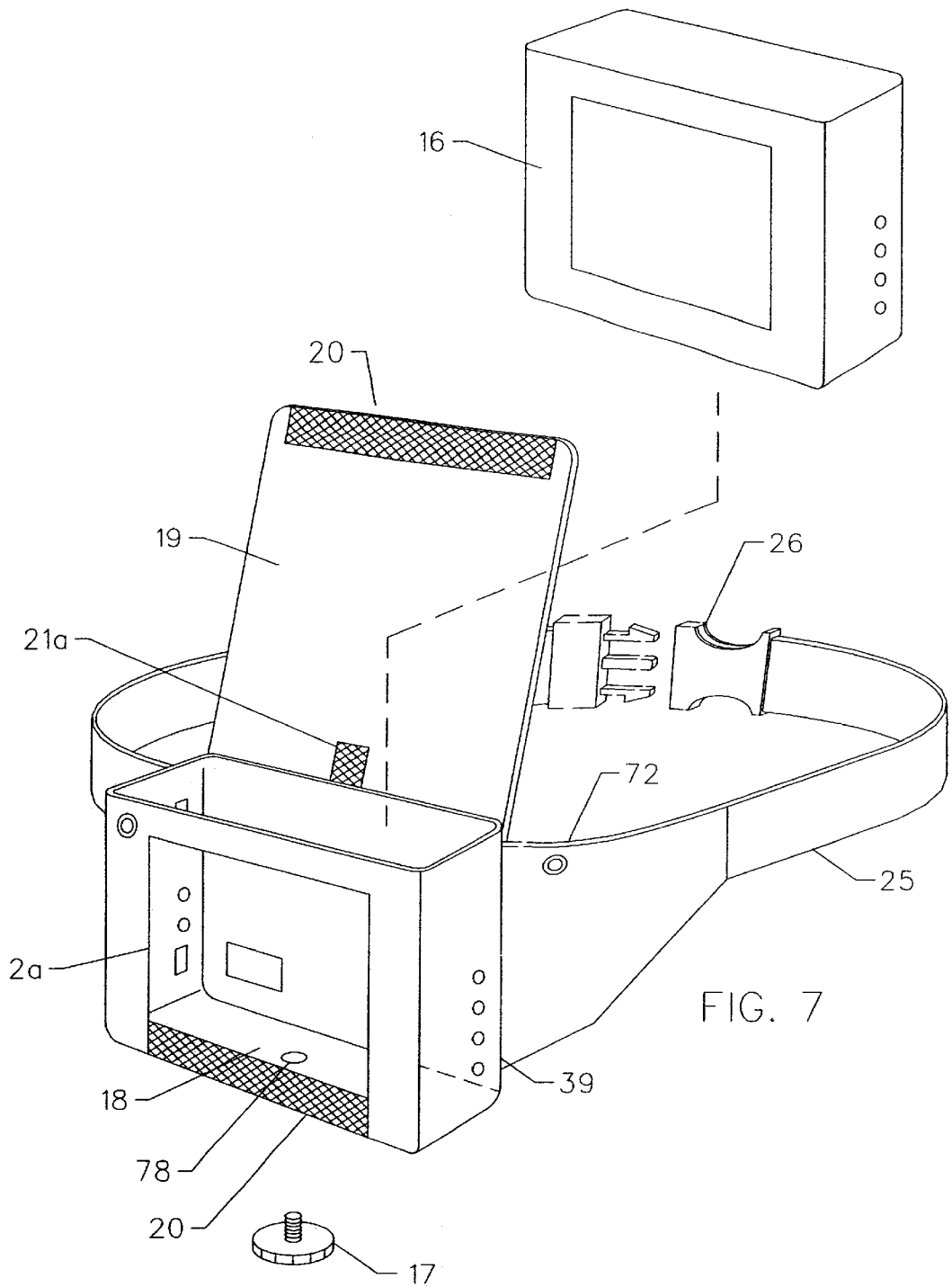
FIG. 7 is a greatly enlarged view of a portion of FIG. 1.

Referring now to FIGS. 3 and 7, the second case 2 has at least one elastic strap 25 capable of attaching the second case 2 to one of the first or second headrests 54a, 54b of the automobile. The elastic strap 25 is arranged horizontally and is sewn to the back of the display device 16. The elastic strap 25 includes a quick release coupler 26 for securing the elastic strap 25 and the second case 2 to the first headrest 54a.

FIGS. 5 and 6 illustrate the rear and front views of the first case 1 as well as the location of the portable electronic components. The bottom of the first case 1 has a zippered storage compartment 35 that houses the AC Adapter, AC and DC power cables, and video cables. This compartment also provides a storage area for the first and second releasable straps 27, 30 when not in use. The alternating current and direct current power cables 34, 36 extend from the storage compartment 35 through one of two flap-covered openings 37 in the rear of the storage compartment 35. The two flap-covered openings 37 are preferably held closed with hoop and loop fasteners 37a.

While the first preferred embodiment of the mounting system 50 is used with a video cassette player, it is understood from this disclosure by those of skill in the art that the present invention can be utilized with various electronic signal generating devices 3. For example, the electronic signal generating device may be a digital video disk player (DVD), a video compact disk player (CD), an electronic game device, a global positioning system (GPS), and other electronic devices. The changes to the first preferred embodiment that would be necessary to accommodate the various electronic devices would be known to those of skill in the art when considered in combination with this disclosure.

Referring to FIG. 6, as mentioned above, the display device 16 and electronic signal generating device 3 are electronically connected to each other with the power and video cables 38. The power and video cables 38 run up and down both sides of the first case 1. The cables 38 are routed from the bottom of the electronic signal generating device 3, up the inside left and right sides of the first case 1, through holes 39 in the second case 2 and into the display device 16.

In operation, as shown in FIGS. 1–8, the mounting system 50 is assembled and used as follows. A user unzips the first case 1 using the zipper handles 11 to unzip the front panel 8 and to allow the pocket 64 to expand outwards from the first case 1. Then, an electronic signal generating device 3 is inserted into the pocket 64 so that hook material 5a secures the electronic signal generating device 3 inside of the pocket 64. Afterwards, the strap 4 is placed around the electronic signal generating device 3 and secured using the buckle 62.

After the electronic signal generating device 3 is secured in the pocket 64 in the lower portion 60 of the first case 1, a display device 16 is inserted into the second case 2 and secured using the locking device 17. The locking device 17 is inserted through the grommet 78 in the bottom side of the second case 2 and threadably engaged with the hole (not shown) in the bottom of the display device 16. The cover 19 is rolled up and secured with the hook and loop material strap 21 and the patch of hook and loop material 21a. Then, the second case 2 is attached to the first case 1 by engaging the hook and loop material 5 on the rear side of the second case 2 with a hook and loop material receiving surface 5 on the abutment 13. Then, the second quick connect device 14 is attached to the second case 2. To attach the second quick connect device 14 to the second case 2 the metal quick release fasteners 76 are inserted into the respective grommets 72 in the second case 2.

Once the electronic signal generating device 3 and the display device 16 are secured within the first case 1, the cables 38 are connected to the electronic signal generating device 3 and the display device 16. The front panel 8 is then aligned with the edges of the first case 1 and a user seals the first case 1 using the zipper handles 11. Thus stored, the electronic signal generating device 3 and the display device 16 are ready for transport in the first case 1. Then, the user grasps the handle 40 to facilitate the carrying of the first case 1.

Once in the back seat of a automobile, the user manipulates the flap-cover openings 37 in the rear side 8a of the first case 1 to extend the appropriate power cable from the first case. Once the appropriate power cable is secured to a power source within the automobile, the first case 1 is positioned with its rear surface generally aligned with a rear surface of the first and second seats 56a, 56b. The first case 1 is also positioned with the bottom side proximate to the internal floor 33 of the automobile. Then, the first quick connect device 52 is used to secure the upper portion of the first case 1 to the first and second headrests 54a, 54b. Specifically, the first releasable straps 27 are wrapped around the first and second headrests 54a, 54b and the quick release fasteners 29, attached to one end of the first releasable straps 27, are secured to the respective upper rings 31. Then, the opposite end of the first releasable straps 27 is secured to a respective middle ring 32 via an S-shaped connector 28. Then, the second releasable straps 30 are used to secure the lower rings 33 to the seat rails 34 of the automobile. The second releasable straps 30 each have a quick release fastener 29 which is used to engage the lower ring 33 and, on the opposite end, have a S-shaped connector 28 that is used to engage the seat rail 34.

Once the first case 1 is securely installed within the automobile, a user unzips the front panel 8 using the zipper handles 11 to expose the upper portion 58 of the first case 1. Once the front panel 8 is folded to expose the upper portion 58 of the first case 1, an elastic cord 9 is used in combination with the catch 66 to secure the front panel 8 in the folded position. This causes the electronic signal generating device 3 to be rotated about the lower portion 60 of the first case 1. In this configuration, the first case 1 allows passengers to conveniently be entertained by viewing the display device 16 and simplifies the manipulating of the electronic signal generating device 3.

When desired, the user can reverse the above procedures to remove the first case 1, and the associated display device 16 and electronic signal generating device 3, from the automobile to transport the electronic components to another location. Thus, the mounting system 50 allows users to easily and securely install entertainment accessories within a automobile in a manner that allows the entertainment accessories to be easily removed and transferred to another automobile or remote location.

From the foregoing description, it can be seen that the present invention comprises a mounting system 50 for releasably securing a display device 16 and an electronic signal generating device 3 in an automobile.

Figure 9:
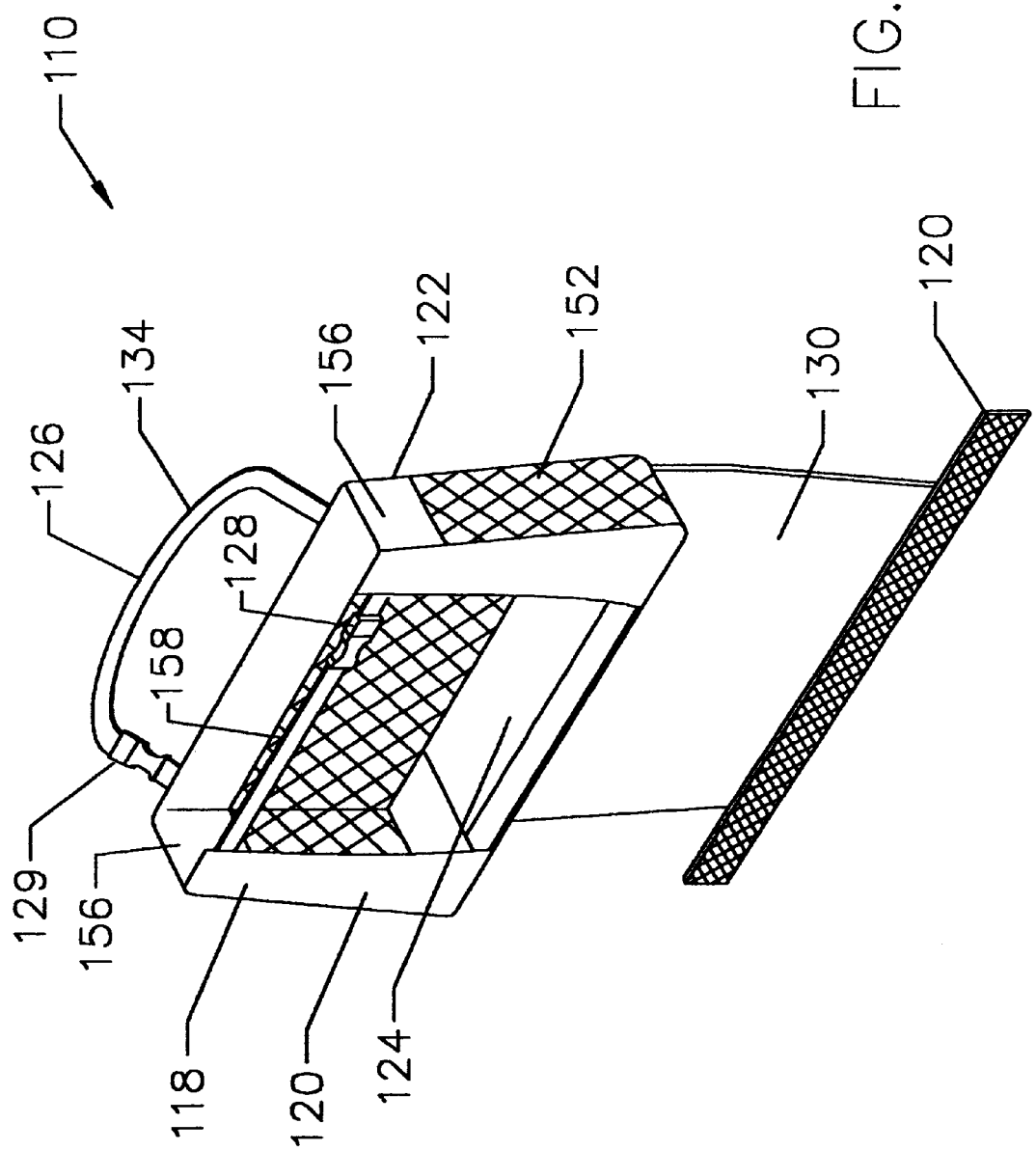
FIG. 9 is a front perspective view of a second preferred embodiment of a mounting device according to the present invention.
Figure 10:
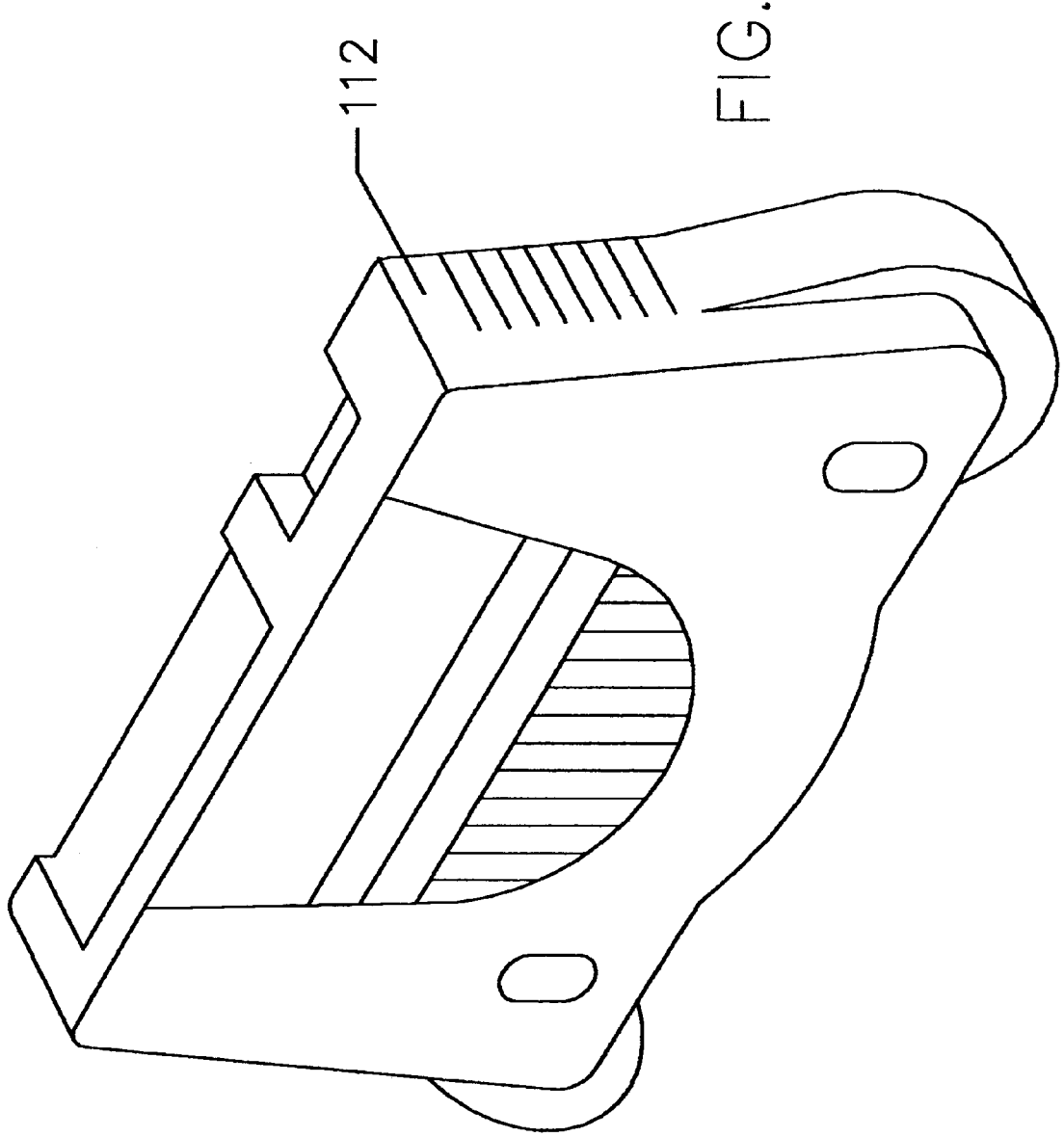
FIG. 10 is a perspective view of an entertainment accessory.
Figure 11:
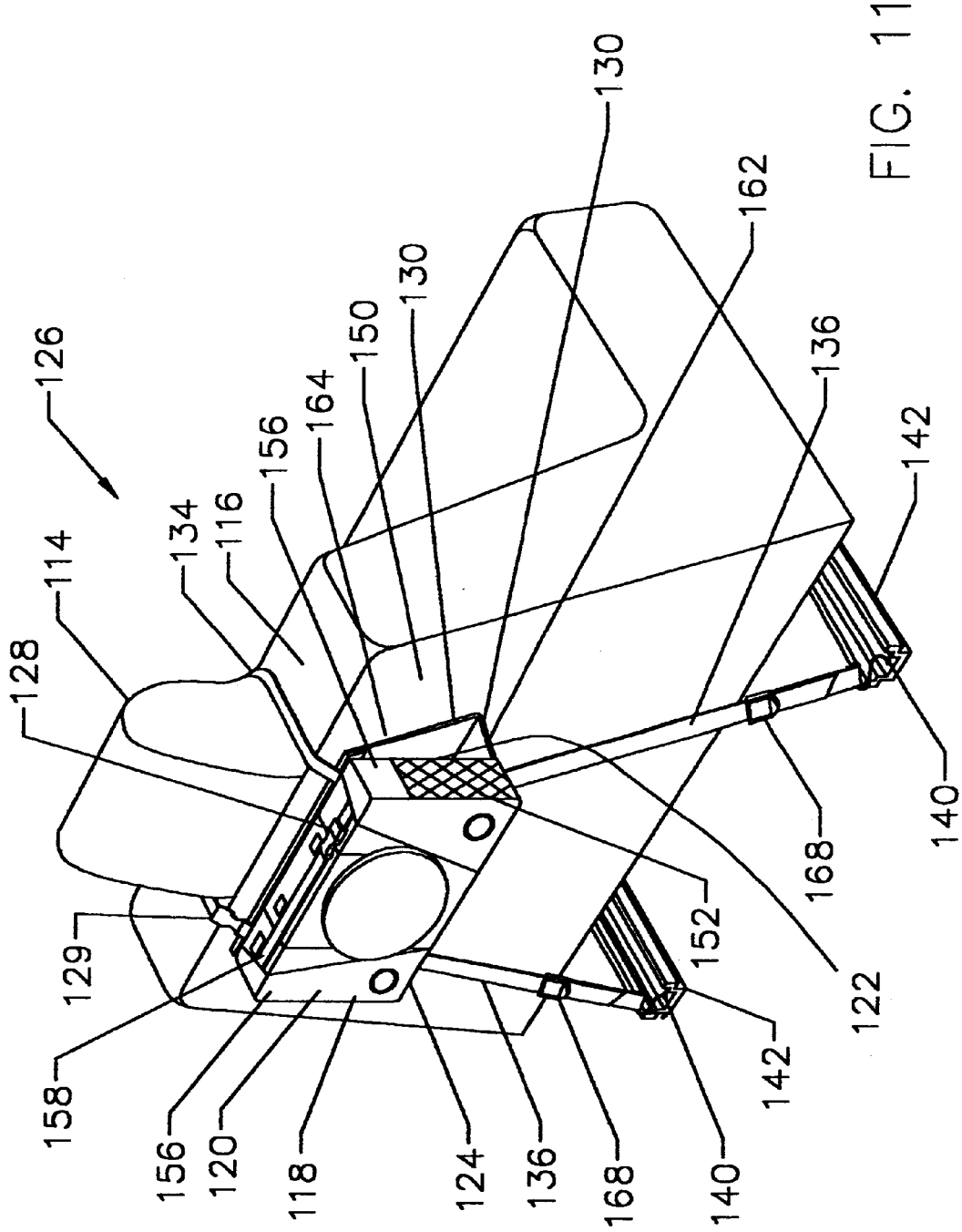
FIG. 11 is a front perspective view of the mounting device of FIG. 9 securing the entertainment accessory of FIG. 10 to the back of a seat of an automobile.
Figure 12:
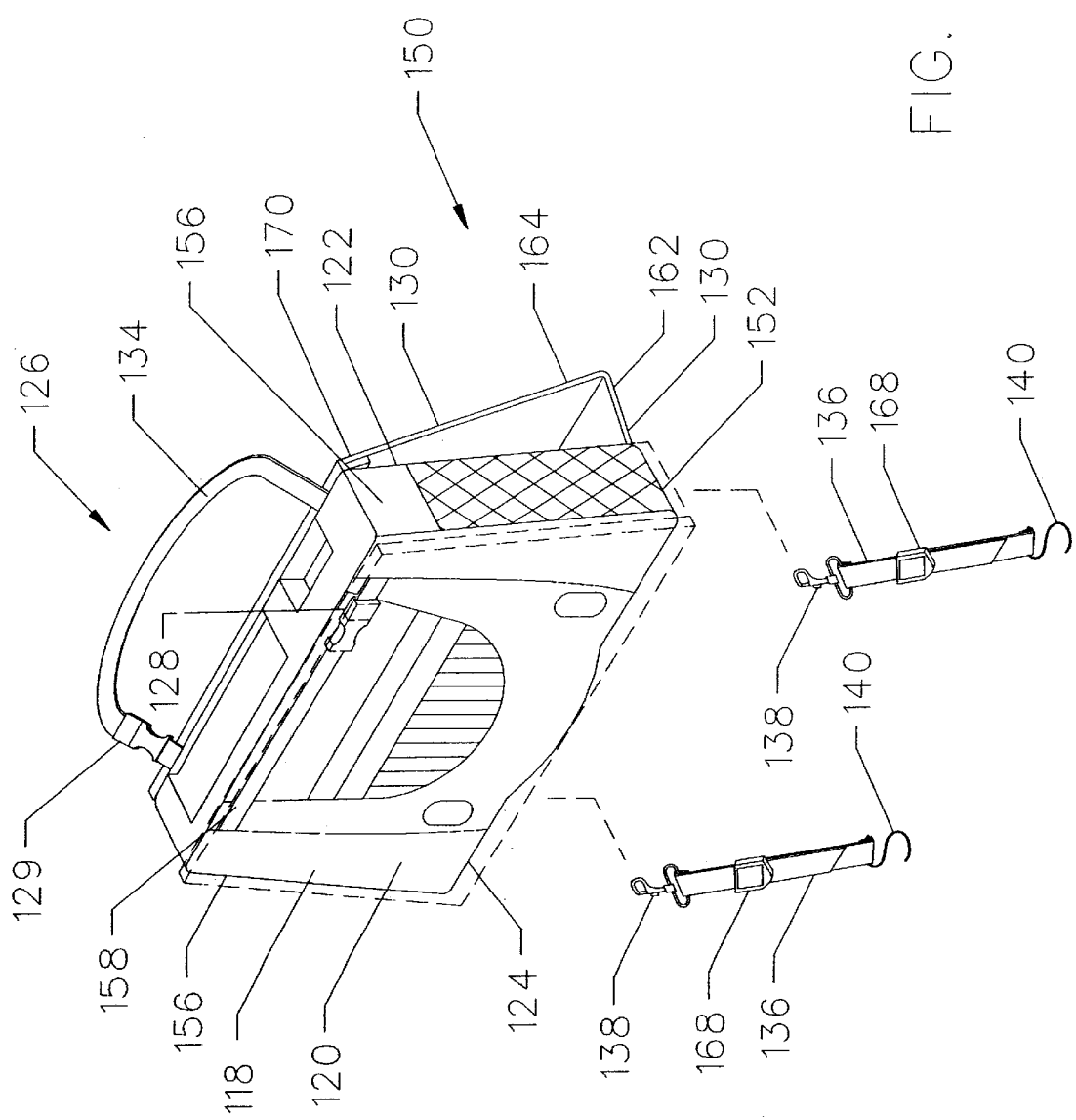
FIG. 12 is an exploded front perspective view of the mounting device of FIG. 9 with the entertainment accessory of FIG. 10 therein.

Referring now to FIGS. 9–13, there is shown a second preferred embodiment of a mounting device according to the present invention, generally designated 110. The mounting device 110 releasably and securely mounts an entertainment accessory 112 within an automobile having a head rest 114 extending from a seat 116. Referring to FIG. 10, an entertainment accessory 112 for use with the mounting device 110 is shown. The entertainment accessory is preferably a homebased video game system, such as that manufactured by NINTENDO, SONY or SEGA. A NINTENDO 64 system is shown in FIGS. 10 and 12 and a SONY PLAY STATION is shown in FIG. 11. However, those of skill in the art will understand from this disclosure that the present invention is not limited to entertainment accessories that are game systems. For instance, the entertainment accessory may also be a video cassette recorder, a video player, a liquid crystal display television, a plasma display television, a cathode ray tube television, a speaker, a speaker system, a laser disk player, a global positioning system, a portable computer, a compact disk player, a digital video disk player, or a toy container (such as a makeup box or a LEGO container).

Referring to FIGS. 9 and 11–13, a case 118 is releasably attached to the headrest 114. The entertainment accessory 112 is positioned within the case 118, as shown in FIGS. 11 and 12. While the second preferred embodiment of the case 118 is designed to hold a generally rectangular entertainment accessory 112, those of skill in the art will understand from this disclosure that the present invention is not limited to cases 118 that are designed to hold rectangularly shaped entertainment accessories 112. For example, the modifications necessary to hold an oval, trapezoidal, circular, or spherical entertainment accessory 112 would be known by those of skill in the art when considered in combination with this disclosure.

The case 118 has a front side 120, a rear side 122, and a bottom side 124. The rear side 122 is formed substantially of mesh material 152. The use of the mesh material 152 allows for heat to be transferred from the entertainment accessory 112 to the atmosphere surrounding the mounting device 110. A pair of end portions 156 each engage an opposite end of the entertainment accessory 112. As shown in FIGS. 9 and 11–13, the end portions 156 are formed essentially of a mesh material 152. The mesh material 152 and the case 118 are preferably constructed of a nylon material. Some portions of the case 118 are padded to protect the entertainment accessory 112. However, those of skill in the art will understand from this disclosure that the present invention may be constructed using a variety of lightweight, durable, flexible materials, such as rayon, polyester, cotton, rubber, polymers, polyvinyl chloride, plastics, and synthetic blends.

Referring to FIGS. 9, 11 and 12, at least one restraining strap 158 is attached to each of the pair of end portions 156 for securing the entertainment accessory 112 within the case 118. The restraining strap 158 uses a quick release snap 128 to fix the entertainment accessory 112 in position. Depending on the type of entertainment accessory 112 being used, the restraining strap 158 can be located across the top or across the front of the case 118. For instance, as shown in FIG. 11, the restraining strap 158 is attached to the top side of the case 118 to secure a SONY PLAYSTATION entertainment accessory 112 inside of the mounting device 110. Alternatively, as shown in FIG. 12, the restraining strap 158 is attached to the front side 120 of the case 118 for a NINTENDO 64 entertainment accessory 112. When the restraining strap 158 is attached to the front side 120 of the case 118, one end of the restraining strap 158 is attached to each of the end portions 156 with the two portions of the restraining strap 158 being joined by a quick release snap 128.

While the preferred embodiment of the mounting device 110 uses a quick release snap 128 to secure the restraining strap 158 about the entertainment accessory 112, those of skill in the art will understand from this disclosure that the present invention is not limited to restraining straps 158 that use quick release snaps 128. For instance, the two ends of the at least one restraining strap 158 can be secured using hook and loop material, buttons, a catch, or an infinitely adjustable buckle.

Referring to FIGS. 9, 11 and 12, a quick connect device 126 is attached to the case 118 for releasably engaging the headrest 114. The quick connect device 126 comprises at least one strap 134. The strap 134 has two portions that are secured about the headrest 114 using a quick release snap 129. Each portion of the strap 134 is preferably attached proximate to one end of the case 118. Then, one portion of the strap 134 is positioned around the headrest 114 and secured to the second portion of the strap 134 via the quick release snap 129. While the preferred embodiment of the mounting device 110 uses a quick release snap 129 to secure the strap 134 about the headrest 114, those of skill in the art will understand from this disclosure that the present invention is not limited to the use of a strap 134 with a quick release snap 129. For example, the two ends of the strap 134 can be secured using buttons, a catch, a hook-and-loop fastener, or an infinitely adjustable buckle.

Referring now to FIGS. 9 and 11–13, a cover 130 has one edge 132 attached to the bottom rear corner of the case 118. The cover 130 is movable between a first position (shown in phantom in FIG. 12) and a second position (shown in solid lines in FIG. 12). The cover 130 overlaps the bottom side 124 and the front side 120 of the case 118 while in the first position. While the cover 130 is in the first position, the case 118 facilitates the carrying of the entertainment accessory 112, using the quick connect device 126 as a handle.

The cover 130 serves as a spacer 150 between the seat 116 and the rear side 122 of the case 118 while in the second position to orient the case 118 in a generally vertical position. This allows the mounting device 110 to compensate for any incline along the rear surface of the seat 116. By orienting the case 118 in the generally vertical position, the screen or controls of the entertainment accessory are conveniently positioned for viewing and use by a user. Furthermore, some entertainment accessories 112, such as the SONY PLAYSTATION, need to oriented vertically to prevent the CD from being displaced from the play position in the CD tray (not shown). To facilitate the use of the cover 130 as a spacer 150, the cover 130 preferably comprises a first rigid panel 162 and a second rigid panel 164. The first rigid panel 162 is interposed between the case 118 and the second rigid panel 164. When the cover 130 is in the first position (the closed position), the first rigid panel 162 effectively forms a bottom panel of the case 118, and the second rigid panel 164 effectively forms a front panel of the case 118. When the cover 130 is in the second position (the open position), the first rigid panel 162 and the second rigid panel 164 cooperate to form the spacer 150 that is positioned between the seat 116 and the rear side 122 of the case 118.

Referring to FIGS. 11 and 12, a pair of bands 136 are releasably attached to the case 118 for attaching the case 118 to at least one seat rail 142 of the seat 114. While the preferred embodiment of the mounting device 110 uses the pair of bands 136 to attach the bottom side 124 of the case 118 proximate to the base of the seat 116, it is understood by those of skill in the art from this disclosure that the present invention is not limited to cases 118 that are secured to seat rails 142. For example, a band (not shown) having D rings (not shown) can be attached around the base of the seat 116 with the D rings positioned along the rear surface of the seat 116. Then the pair of bands 136 can be secured to the D rings using the S shaped connector 140. Adjustable clips 168 are preferably used to tighten the pair of bands 136 once the case 118 is properly positioned on the rear surface of the seat 116. Additionally, adjustable clips 168 can also be incorporated on either of the at least one strap 134 used with the quick connect device 126 or with the restraining strap 158 used to secure the entertainment accessory 112 within the case 118.

As shown in FIG. 12, quick release fasteners 138 are used to attach one end of each of the pair of bands 136 to the bottom side 124 of the case 118. Alternatively, buttons, snaps, hook and loop material, or S shaped connectors can be used to connect the pair of bands 136 to the bottom side 124 of the case 118.

Figure 13:
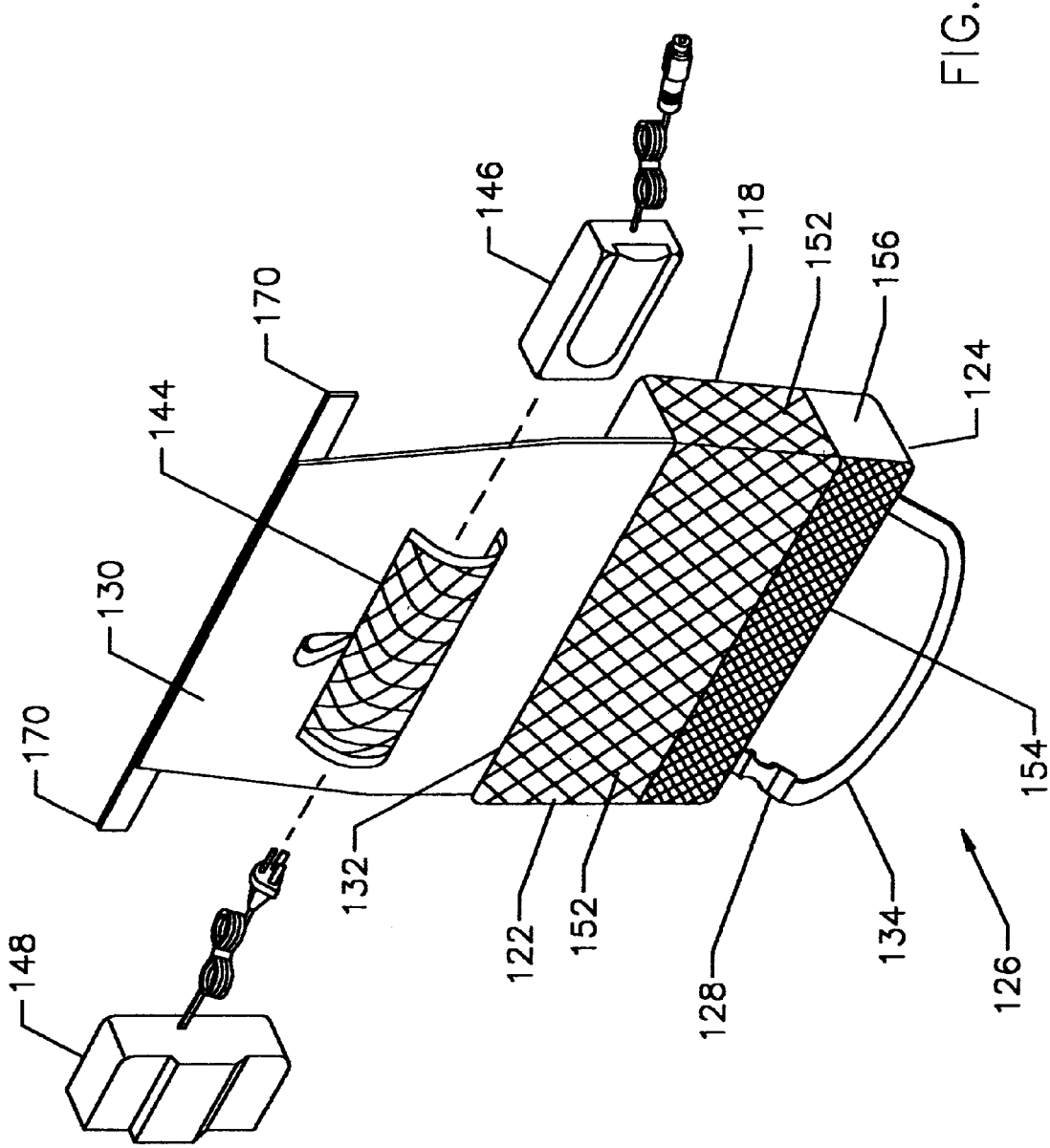
FIG. 13 is an exploded rear perspective view of the mounting device shown in FIG. 9.

Referring to FIG. 13, an enclosure 144 is attached to the cover 130 for holding a power inverter 146 between the case 118 and the cover 130 while the cover 130 is positioned to serve as the spacer 150. By positioning the power inverter 146 between the cover 130 and the case 118, the spacer 150 offsets the angle of the seat and positions the entertainment accessory 112 in a vertical position (this is preferable for entertainment accessories utilizing CD technology). The enclosure 144 is preferably made of a mesh material to allow heat generated by the power inverter 146 to be transferred to the outside of the enclosure 144.

The power inverter 146 converts power from 12 volts direct current to alternating current. It is preferable that the power supplied by the power inverter 146 be one of 100, 115, 230, or 240 volts with a frequency of 50 hertz or 60 hertz depending on the country in which the electronic signal generating device 3 is intended to be used.

The alternating current adapter 148 is commonly used with NINTENDO game systems. The alternating current adapter 148 is shown for reference only and is not part of the present invention.

When the cover 130 is positioned to serve as a spacer 150, a hook and loop material strip 170 is preferably used to secure the second rigid panel 164 to the case 118 via a complementary mating strip of hook and loop material 154 that is located proximate to the top side of the case 118 along the rear side 122 of the case 118. Referring to FIGS. 9 and 11, the hook and loop material strip 170 preferably runs at least the entire length of one side of the cover 130. However, those of skill in the art will understand from this disclosure that, depending on the size of the entertainment accessory 112, it may be preferable to use a smaller strip of hook and loop material (not shown).

Additionally, a display device (such as a liquid crystal display or a television) for being releasably engaged with the at least one seat 116 may be incorporated into the mounting device 110. For instance, the display device 16 of the first preferred embodiment may be operatively coupled with the entertainment accessory 112. That is, the display device 16 could be mounted to the first headrest 56a via the second case 2 and the mounting device 110 could be mounted to the second headrest 56b. Alternatively, the mounting device 110 and the second case 2 could be combined into the first case 1. That is, the entertainment accessory 112 could be located in the pocket 64 of the first case 1, instead of being separately mounted in the mounting device 110.

Referring to FIGS. 9–13, the second embodiment of a mounting device 110 according to the present invention is used in operation as follows. A user lays the case 118 on a table or other supporting surface. Then the quick release snap 128 on the restraining strap 158 is disconnected to allow the end portions 156 to be pushed outwards. Then, the entertainment accessory 112 is placed within the case 118 by placing one end of the entertainment accessory 112 inside of an end portion 156 and then pulling the remaining end portion 156 over the opposite end of the entertainment accessory 112. Once the entertainment accessory is properly positioned between the end portions 156 of the case 118, the user places both ends of the restraining strap 158 along one side of the entertainment accessory 112 and secures the quick release snap 18 into a locked position.

Then the cover 130 is moved into the first position (the closed position) causing the first rigid panel 162 to effectively form a bottom side of the case 118 and causing the second rigid panel 164 to effectively form a front panel of the case 118. After positioning the cover 130 in the closed position, it is secured in the closed position by the engagement of a portion of the hook and loop material strip 170 with the hook and loop material 154 on the rear side 122 of the case 118.

Then, the appropriate power inverter 146 is placed within the mesh enclosure 144. Thus configured, the user can easily transport the entertainment accessory 112 and the associated power inverter 146 (along with other electrical connectors) by using the strap 134. The strap 134 can be grasped in a hand for carrying in a fashion similar to that in which a briefcase is carried. Thus, the mounting device 110 is used to transport the entertainment accessory 112 to an automobile or other powered vehicle.

Once inside the automobile, a user removes the portions of the power inverter 146 necessary to connect a power supply to the entertainment accessory 112. Then, portions of the hook and loop material strip 170 are disengaged from the hook and loop material 156 on the rear side 122 of the case 118 to allow the cover 130 to hang below the case 118, as shown in FIG. 9. Afterwards, the user disconnects the quick release snap 128 of the strap 134 that forms the quick connect device 126 and positions the strap 134 around the headrest 114 of a seat 116. Once the strap 134 encircles a portion of the headrest 114 or a suitable upper portion of the seat 116, the quick release snap 128 is re-fastened to vertically support the case 118 and the enclosed entertainment accessory 112. Then, the appropriate power connections and electronic connectors are attached to the power supply and the entertainment accessory 112, as well as any display devices that are being used with the entertainment accessory 112. Then, the cover 130 is moved to and secured in the second position with the hook and look material strap 170 to serve as a spacer 150 between the case 118 and the rear surface of the seat 116.

After the cover 130 is properly positioned, the pair of bands 136 are attached to D rings (not shown) that are positioned on the bottom side 124 of the case 118 using quick release fasteners 138. Then the opposite ends of the pair of bands 136 are attached to the seat rails 142 using S shaped connectors 140. Once the pair of bands 136 are connected to both the case 118 and the seat rails 142, the straps are tightened using the infinitely adjustable clips 168. By tightening the pair of bands 136 using the clips 168, the entertainment accessory 112 is safely and securely mounted along the rear surface of a seat 116. The entertainment accessory 112 is then connected to the display device 16 and suitable game controllers (not shown) in a manner well understood by those of skill in the art. At this point, the video game source (e.g., CD or cartridge (not shown)) can be inserted into the entertainment accessory 112 and the game playing can begin.

When desired, the user can reverse the above procedures to remove the case 118, and the associated entertainment accessory 112, from the automobile to transport the entertainment accessory 112 to another automobile or location. Thus, the mounting device 110 allows users to easily install entertainment accessories within an automobile in a manner that allows the entertainment accessories 112 to be easily removed and transferred to another automobile or remote location.

It is recognized by those skilled in the art, that changes may be made to the above-described embodiments of the invention without departing from the broad inventive concept thereof It is understood, therefore, that this invention is not limited to the particular embodiments disclosed, but is intended to cover all modifications which are within the spirit and scope of the invention as defined by the appended claims.

What is claimed is:

1. A mounting device for releasably and securely mounting an entertainment accessory within an automobile having a headrest extending from a seat, comprising:

an entertainment accessory;

a case for being releasably attached to the headrest, said entertainment accessory being positioned within said case, said case having a front side, a rear side, and a bottom side;

a quick connect device attached to said case for releasably engaging the headrest; and a cover having one edge attached to said case, said cover being movable between a first position and a second position, said cover overlapping said bottom side and said front side of said case while in said first position and said cover serving as a spacer between the seat and said rear side of said case while in the second position to orient said case in a generally vertical position.

2. The device of claim 1, wherein said quick connect device comprises at least one strap.

3. The device of claim 1, further comprising a pair of bands releasably attached to said case for attaching said case to at least one seat rail of the seat.

4. The device of claim 1, further comprising an enclosure attached to said cover for holding a power inverter between said case and said cover while said cover is positioned to serve as said spacer.

5. The device of claim 1, wherein said case comprises:

said rear side formed substantially of at least one mesh material; and a pair of end portions each engaging an opposite end of said entertainment accessory.

6. The device of claim 5, further comprising at least one restraining strap attached to each of said pair of end portions for securing the entertainment accessory within the case.

7. The device of claim 1, wherein said entertainment accessory is any one of a video cassette player, a video cassette recorder, a digital video disk player, a video disk player, a compact disk player, and an electronic game.

8. A device for releasably and securely mounting an entertainment accessory within an automobile having a headrest extending from a seat, comprising:

a case for being releasably attached to the headrest and for receiving the entertainment accessory, said case having a front side oriented generally rearwardly from said seat and a bottom side generally facing an internal floor of the automobile;

at least one strap attached to said case for releasably engaging the headrest;

a cover attached to said case and comprising a first rigid panel and a second rigid panel, said first rigid panel interposed between said case and said second rigid panel; and said cover being positionable to serve as a spacer between the seat and said case to orient said case in a generally vertical position, wherein said cover is moveable between a closed position, wherein said first rigid panel is positioned adjacent said bottom side of said case and said second rigid panel is positioned adjacent said front side to form a front panel of said case, and an open position, where said first rigid panel and said second rigid panel cooperate to form said spacer that is positioned between the seat and said rear panel of said case.

9. The device of claim 8, wherein said case comprises:

a rear panel formed substantially of at least one mesh material;

a pair of end portions each attached to opposite edges of said rear panel for engaging the entertainment accessory; and at least one restraining strap attached to each of said pair of end portions to secure the entertainment accessory therebetween.

10. The device of claim 8, further comprising a display device for being releasably engaged with the seat, said display device being operatively coupled with the entertainment accessory.

11. A device for releasably and securely mounting an entertainment accessory within an automobile having a headrest extending from a seat, comprising:
- a case for being releasably attached to the headrest and for receiving the entertainment accessory, said case comprising:
  - a rear panel formed substantially of at least one mesh material;
  - a pair of end portions each attached to opposite edges of said rear panel for engaging the entertainment accessory; and
  - at least one restraining strap attached to each of said pair of end portions to secure the entertainment accessory therebetween;
- at least one strap attached to said case for releasably engaging the headrest;
- a cover attached to said case and comprising a first rigid panel and a second rigid panel, said first rigid panel interposed between said case and said second rigid panel;
- said cover being positionable to serve as a spacer between the seat and said case to orient said case in a generally vertical position, wherein said cover is moveable between a closed position, where said first rigid panel is positioned adjacent said bottom side of said case and said second rigid panel is positioned adjacent said front side to form a front panel of said case, and an open position, where said first rigid panel and said second rigid panel cooperate to form said spacer that is positioned between the seat and said rear panel of said case; and
- a display device operatively coupled with the entertainment accessory.

\* \* \* \* \*